US009545950B2

(12) United States Patent
Lee et al.

(10) Patent No.: US 9,545,950 B2
(45) Date of Patent: Jan. 17, 2017

(54) CONNECTION STRUCTURE OF A VEHICLE

(71) Applicant: HYUNDAI MOTOR COMPANY, Seoul (KR)

(72) Inventors: Sun Ju Lee, Incheon (KR); Kwang Hee An, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/698,475

(22) Filed: Apr. 28, 2015

(65) Prior Publication Data
US 2016/0107695 A1 Apr. 21, 2016

(30) Foreign Application Priority Data

Oct. 17, 2014 (KR) ........................ 10-2014-0141171

(51) Int. Cl.
*B62D 21/15* (2006.01)
*B62D 25/08* (2006.01)

(52) U.S. Cl.
CPC ........... *B62D 21/152* (2013.01); *B62D 25/082* (2013.01)

(58) Field of Classification Search
CPC . B60R 19/24; B60R 2019/247; B62D 21/152; B62D 21/155; B62D 25/082; B62D 25/085
See application file for complete search history.

(56) References Cited

U.S. PATENT DOCUMENTS

| 4,909,565 | A | * | 3/1990 | Harasaki | B62D 21/152 296/187.09 |
| 5,810,426 | A | * | 9/1998 | Bovellan | B62D 21/155 296/187.03 |
| 6,598,933 | B2 | * | 7/2003 | Taguchi | B62D 21/152 296/198 |
| 6,938,950 | B2 | * | 9/2005 | Nagafuchi | B62D 25/082 296/187.09 |
| 7,144,073 | B2 | * | 12/2006 | Uchida | B62D 21/152 296/193.09 |
| 7,461,890 | B2 | * | 12/2008 | Yatsuda | B62D 25/082 296/203.02 |

(Continued)

FOREIGN PATENT DOCUMENTS

| DE | 4104894 A1 | * | 9/1991 | ........... B62D 21/152 |
| DE | 19651627 A1 | * | 6/1998 | ........... B62D 25/082 |

(Continued)

*Primary Examiner* — Glenn Dayoan
*Assistant Examiner* — Paul Chenevert
(74) *Attorney, Agent, or Firm* — McDermott Will & Emery LLP

(57) ABSTRACT

A connection structure of a vehicle includes a fender apron upper extending in a length direction of the vehicle, a front side member extending in a length direction of the vehicle, a front reinforcement, a bumper, and a back beam mounted in an inner side of the bumper. A front end portion of the fender apron upper is connected to one end of the front reinforcement and a rear end portion of the fender apron upper is connected to at least one of a cowl and a front pillar. A front end portion of the front side member is connected to the back beam and a rear end portion of the front side member is connected to a lower portion of the vehicle body. The other end of the front reinforcement is coupled to a front side portion of the front side member in the length direction thereof.

14 Claims, 9 Drawing Sheets

(56) References Cited

U.S. PATENT DOCUMENTS

| | | | | | |
|---|---|---|---|---|---|
| 8,002,337 | B2* | 8/2011 | Baccouche | ........... | B62D 21/152 296/187.09 |
| 8,393,673 | B2* | 3/2013 | Terada | ................. | B62D 25/088 296/187.09 |
| 8,485,592 | B2* | 7/2013 | Shin | .................... | B62D 21/152 293/149 |
| 8,668,252 | B2* | 3/2014 | Yasuhara | ............... | B62D 21/11 296/187.08 |
| 8,882,184 | B2* | 11/2014 | Naito | ................... | B62D 25/082 296/203.02 |
| 8,919,835 | B1* | 12/2014 | Han | ...................... | B62D 21/11 293/133 |
| 8,967,671 | B2* | 3/2015 | Kim | .................... | B62D 25/082 280/785 |
| 8,973,975 | B2* | 3/2015 | Saitou | .................. | B62D 21/15 296/187.09 |
| 9,004,576 | B2* | 4/2015 | Sakakibara | ......... | B62D 25/085 293/133 |
| 9,096,275 | B2* | 8/2015 | Yasui | .................... | B62D 21/11 |
| 9,150,253 | B2* | 10/2015 | Watanabe | ............... | B62D 21/11 |
| 9,233,719 | B2* | 1/2016 | Shibata | ............... | B62D 25/082 |
| 9,242,676 | B2* | 1/2016 | Park | .................... | B62D 25/082 |
| 9,283,995 | B2* | 3/2016 | Hisazumi | .............. | B62D 25/081 |
| 2002/0008408 | A1* | 1/2002 | Tilsner | ................. | B62D 25/082 296/193.09 |
| 2009/0243336 | A1* | 10/2009 | Honji | ................... | B62D 21/152 296/187.09 |
| 2015/0314810 | A1* | 11/2015 | Watanabe | ................ | B60K 5/12 296/203.02 |
| 2015/0360633 | A1* | 12/2015 | Nishida | ................ | B62D 21/152 293/133 |
| 2016/0016611 | A1* | 1/2016 | Shirooka | ................ | B62D 21/11 296/187.09 |
| 2016/0039373 | A1* | 2/2016 | Yamada | ................. | B60R 19/24 293/132 |
| 2016/0152273 | A1* | 6/2016 | Kuriyama | ............. | B62D 21/152 296/187.09 |

FOREIGN PATENT DOCUMENTS

| | | | | |
|---|---|---|---|---|
| DE | 102004001747 A1 * | 8/2005 | ........... | B62D 21/152 |
| DE | WO 2007104413 A1 * | 9/2007 | ............ | B62D 21/152 |
| FR | WO 2005113319 A1 * | 12/2005 | ............ | B62D 21/152 |
| JP | 2007-216760 A | 8/2007 | | |
| JP | 2008-195204 A | 8/2008 | | |
| KR | 10-2014-0024654 A | 3/2014 | | |

* cited by examiner

A - A 1 kind of faces coupling

B - B

CONNECTION STRUCTURE OF A VEHICLE

CROSS-REFERENCE TO RELATED APPLICATION

The present application claims the benefit of priority to Korean Patent Application Number 10-2014-0141171 filed on Oct. 17, 2014, the entire contents of which application are incorporated herein for all purposes by this reference.

TECHNICAL FIELD

The present disclosure relates to a connection structure of a vehicle, and more particularly, to a connection structure of a fender apron, a front side member, and a front sub-frame.

BACKGROUND

In general, front structures of a vehicle body are formed with at least one ring-shaped or quadrangle frame to cope with a transverse load generated when the vehicle corners and the accompanying torsion or bending and to satisfy crash-related marketability standards which are being strengthened.

Diverse connection structures for forming the ring-shaped or quadrangle frames are being applied to commercial vehicles. For example, there is the ring-shaped (or quadrangle) structure of front sub-frame, and the ring-shaped (or quadrangle) structure formed by connection of left/right front side members, dash cross member, and a back beam of a front of a vehicle body is also a same kind.

FIG. 1 is a perspective view of a connection structure of a vehicle in the related art.

FIG. 3 is a cross-sectional view for showing details of a connection structure of a vehicle in the related art.

Referring to FIG. 1 and FIG. 3, the ring-shaped (or quadrangle) structure formed by connection of left/right front side members 20, a dash cross member 60, and a back beam 50 is shown in a related art connection structure of a vehicle.

In related art, a fender apron upper 10 is coupled to a middle portion of a front side member 20 in a length direction thereof by a fender apron front lower reinforcement 11.

Only a rear member in a length direction of a vehicle in a ring-shaped structure of a front sub-frame 70 is shown in FIG. 1, because a front member of the front sub-frame 70 and a front member of the front side member 20 are not coupled.

Referring to FIG. 3, details of a related art connection structure of a vehicle are illustrated.

Referring to a cross section A-A of FIG. 3, both ends of a fender apron front lower reinforcement 11 and a fender apron inner front 12 are respectively coupled to a fender apron upper 10 and a front side member 20 such that the fender apron upper 10 and the front side member 20 are connected.

Particularly, a front side member 20 and a fender apron front lower reinforcement 11 or a fender apron inner front 12 are coupled at contacting surfaces substantially perpendicular to a width direction of a vehicle.

Therefore, fractures of the contacting surfaces can easily happen by shear load when colliding because only one kind of faces almost perpendicular to the width direction of the vehicle are coupled in a connection structure of a fender apron upper 10 and a front side member 20.

A crash barrier may destroy a vehicle body and intrude inside the body. In case of a small overlap crash, and thereby a transverse behavior of the vehicle is almost not generated. Accordingly, almost 100% of crash energy is transmitted to the vehicle body.

This kind of a connection structure is especially dangerous, because the crash energy is not distributed to different members of the vehicle body and is concentrated to a front side member 20.

This can cause a severe injury or a death of occupants.

Therefore, it is generally the case to cope with an accident of a small overlap crash by adding a reinforcement member or a plurality thereof to a transfer path of crash energy.

In addition, transverse stiffness of an engine room is not secured enough because the front member of the front sub-frame 70 and the front member of the front side member 20 are not well connected to each other.

The above information disclosed in this Background section is only for enhancement of understanding of the background of the invention and therefore it may contain information that does not form the prior art that is already known in this country to a person of ordinary skill in the art.

SUMMARY

Various aspects of embodiments of the present invention are directed to providing a connection structure of a vehicle. In certain embodiments, the connection structure may increase lateral stiffness of an engine room, decrease weight and cost, minimize deformation of an occupant room, and decrease degree of a risk of occupants' injury.

In various aspects of embodiments of the present invention, a connection structure of a vehicle includes a fender apron upper extending in a length direction of the vehicle. The fender apron upper has a front end portion and a rear end portion. A front side member extends in the length direction of the vehicle and has a front end portion and a rear end portion. A front reinforcement, a bumper, and a back beam mounted in an inner side of the bumper are also included. The front end portion of the fender apron upper may be connected to the front reinforcement and the rear end portion of the fender apron upper may be connected to at least one of a cowl and a front pillar such that the fender apron upper strengthens a front portion and a side portion of the vehicle body. The front end portion of the front side member may be connected to the back beam in order to absorb an external impact and the rear end portion of the front side member may be connected to a lower portion of the vehicle body such that the front side member forms a part of a frame of the front portion of the vehicle body. One end of the front reinforcement may be coupled to the front end portion of the fender apron upper and the other end of the front reinforcement may be coupled to a front side portion of the front side member. An exterior surface of an inner end portion of the front reinforcement in a width direction of the vehicle may make contact with an interior surface of the front side member. The front side member comprises: an inner portion disposed at an inner side in the width direction of the vehicle; and an outer portion disposed at an outer side in the width direction of the vehicle. The front reinforcement is mounted such that the exterior surface of the inner end portion of the front reinforcement in the width direction of the vehicle makes contact with an interior surface of the inner portion of the front side member. A cross section of the front reinforcement, substantially perpendicular to the length direction thereof, is an open shape including a straight line and at least two side lines, each of two of the at least two side lines is connected to an end of the straight line, and an opening of the open shape is opposite the straight line.

In certain embodiments, the front reinforcement may be mounted such that the length direction of the front reinforcement is parallel or substantially parallel to the width direction of the vehicle.

In certain embodiments, an interior surface or an exterior surface of a front end portion of the outer portion of the front side member in a length direction thereof may make contact with a rear surface of the front reinforcement in the length direction of the vehicle.

In certain embodiments, a portion of the exterior surface of the inner end portion of the front reinforcement in the width direction of the vehicle may have a same or a substantially same shape as the interior surface of the inner portion of the front side member.

In certain embodiments, a cross section of the front reinforcement, substantially perpendicular to the length direction thereof, may be an open shape including a straight line and at least two side lines. Each of two of the at least two side lines may be connected to an end of the straight line, and an opening of the open shape may be opposite the straight line.

In certain embodiments, the fender apron upper may include an inner portion disposed at an inner side in the width direction of the vehicle and an outer portion disposed at an outer side in the width direction of the vehicle. An exterior surface of an outer end portion of the front reinforcement in the width direction of the vehicle may make contact with an interior surface or an exterior surface of a front end portion of the fender apron upper in a length direction thereof.

In certain embodiments, an outer end portion of the front reinforcement in the width direction of the vehicle may make contact with an interior surface of a front end portion of the outer portion of the fender apron upper.

In certain embodiments, the connection structure of a vehicle may further include a front sub-frame forming a ring-shaped or quadrangle frame of the front portion of the vehicle body and supporting an engine and a suspension module. A mounting bracket coupling the front reinforcement to the front sub-frame, and an extension gusset coupling the front side member to the front sub-frame may also be included. The mounting bracket may be mounted such that an interior surface of an upper end portion of the mounting bracket in a height direction of the vehicle makes contact with an exterior surface of the front reinforcement. The extension gusset may be mounted such that an interior surface of an upper end portion of the extension gusset in the height direction of the vehicle makes contact with an exterior surface of the front side member.

In certain embodiments, the connection structure may further include an outer front extension making contact with at least one of a front end of the front side member in a length direction thereof, a front end of the front reinforcement in the length direction of the vehicle, a front end of the mounting bracket in the length direction of the vehicle, and a front end of the extension gusset in the length direction of the vehicle, in order to close a face including at least one of the front ends.

In certain embodiments, the connection structure may further comprise a front sub-frame forming a ring-shaped or quadrangle frame of the front portion of the vehicle body and supporting an engine and a suspension module, a mounting bracket coupling the front reinforcement and the front sub-frame, and an extension gusset coupling the front side member to the front sub-frame. The mounting bracket may be mounted such that an interior surface of an upper end portion of the mounting bracket in a height direction of the vehicle makes contact with at least one of a lower surface of the front reinforcement in the height direction of the vehicle and a rear surface of the front reinforcement in the length direction of the vehicle. The extension gusset may be mounted such that an interior surface of an upper end portion of the extension gusset in the height direction of the vehicle makes contact with an exterior surface of the inner portion of the front side member.

In certain embodiments, the connection structure may further include an outer front extension making contact with at least one of a front end of the inner portion of the front side member in a length direction thereof, a front end of the front reinforcement in a length direction of the vehicle, a front end of the mounting bracket in the length direction of the vehicle, and a front end of the extension gusset in the length direction of the vehicle, in order to close a face including at least one of the front ends.

In certain embodiments, a bolt may be mounted on a lower portion of the mounting bracket, and a lower portion of the bolt in the height direction of the vehicle may be coupled to a bolt coupling portion of the front sub-frame and an upper portion of the bolt in the height direction of the vehicle may be coupled to the front reinforcement.

In certain embodiments, the upper portion of the bolt in the height direction of the vehicle and the front reinforcement may be coupled through $CO_2$ welding.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s)

to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, unless explicitly described to the contrary, the word "comprise" and variations such as "comprises" or "comprising" will be understood to imply the inclusion of stated elements but not the exclusion of any other elements and the name of a component doesn't set limits to the function of the component concerned.

Figure 2:
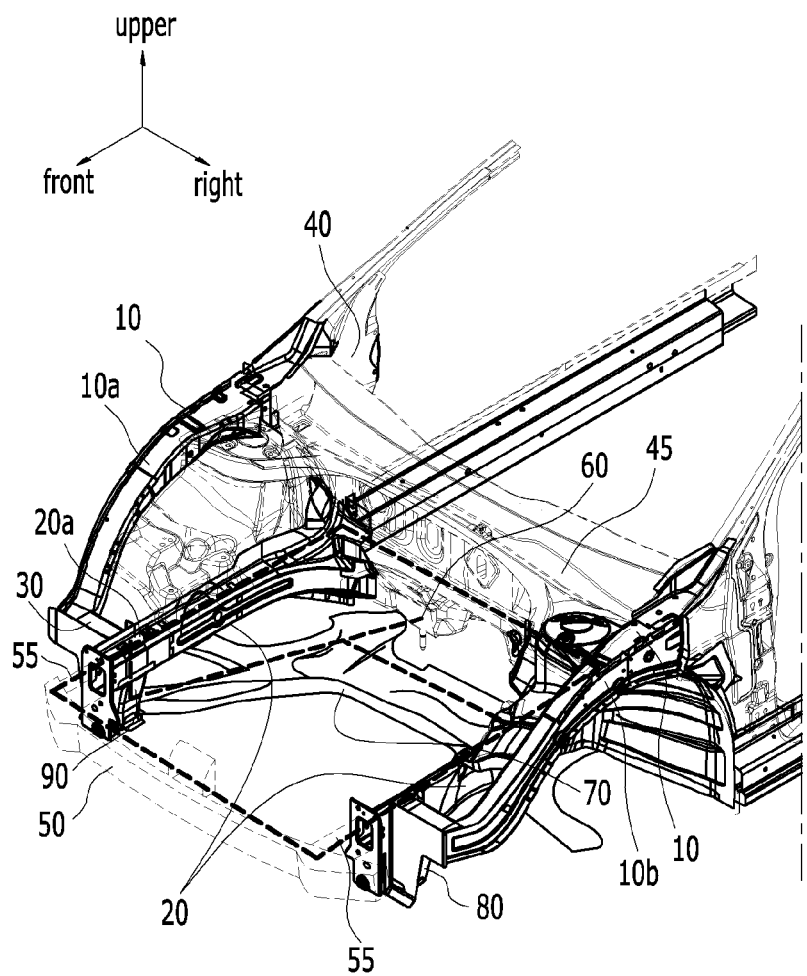
FIG. 2 is a perspective view of an exemplary connection structure of a vehicle according to an embodiment of the present invention.

FIG. 2 is a perspective view of an exemplary connection structure of a vehicle according to an embodiment of the present invention.

Figure 4:
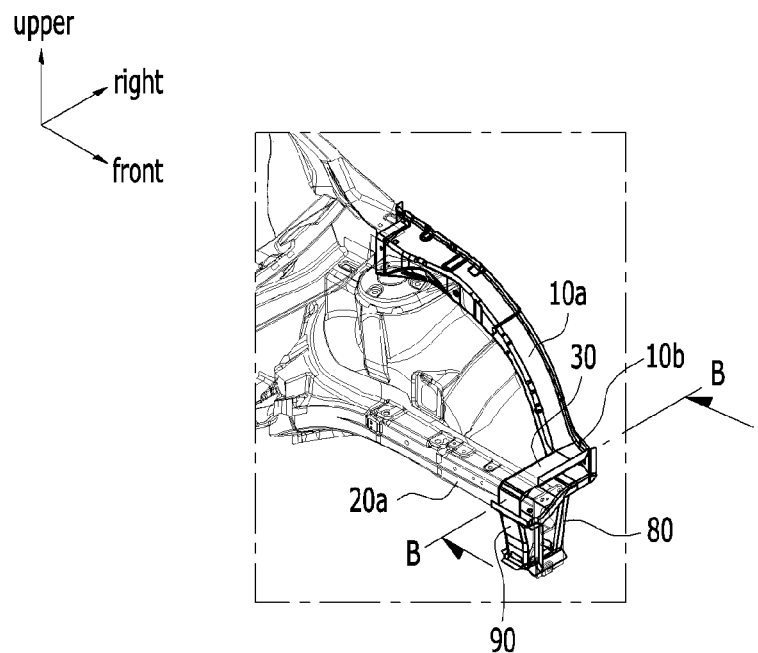
FIG. 4 is a cross-sectional view for showing details of an exemplary connection structure of a vehicle according to an embodiment of the present invention.
Figure 4:
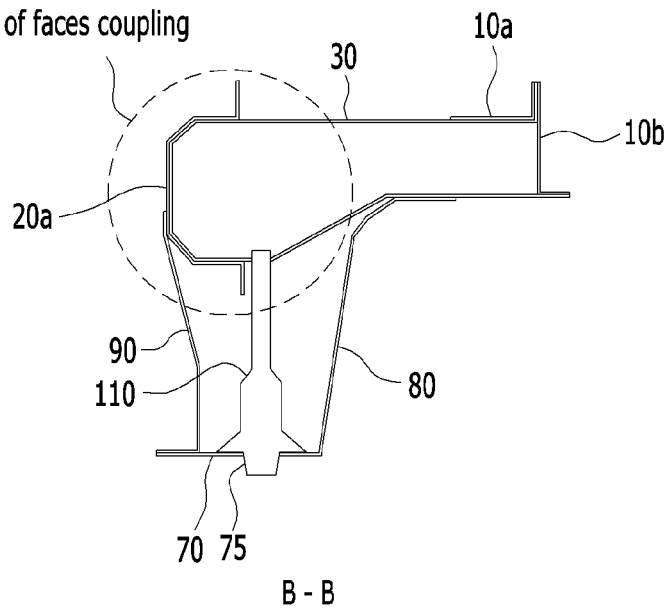

FIG. 4 is a cross-sectional view for showing details of an exemplary connection structure of a vehicle according to an embodiment of the present invention.

Figure 1:
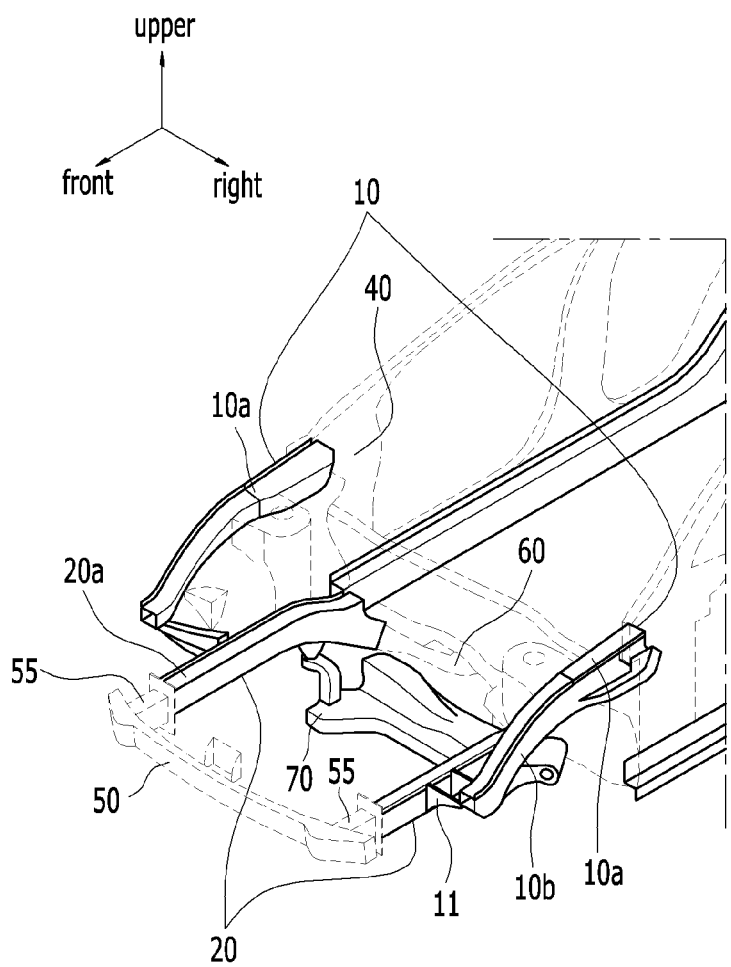
FIG. 1 is a perspective view of a connection structure of a vehicle in the related art.
Figure 3:
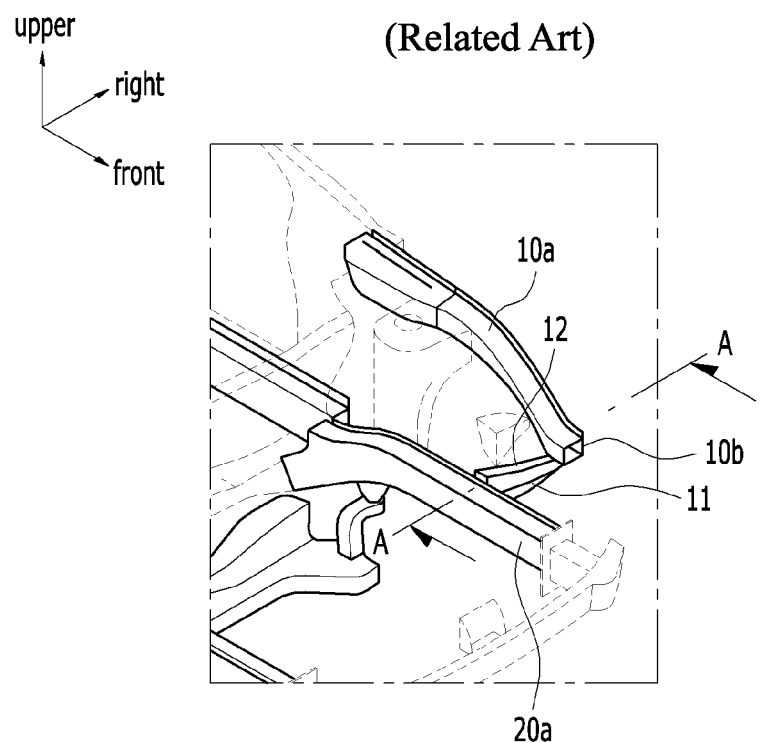
FIG. 3 is a cross-sectional view for showing details of a connection structure of a vehicle in the related art.
Figure 3:
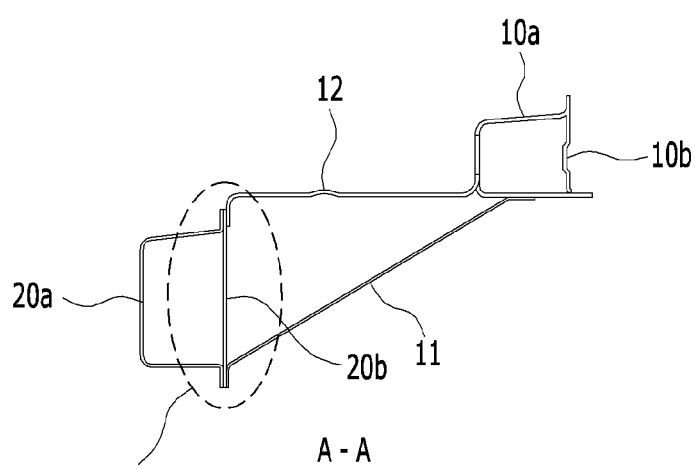

Referring to FIG. 2 and FIG. 4, contrary to the related art of FIG. 1 and FIG. 3, a ring-shaped (or quadrangle) structure formed by connection of left/right front side members 20, dash cross member 60, and a back beam 50 and a ring-shaped (or quadrangle) structure of a front sub-frame 70 are effectively connected with each other in an exemplary connection structure of a vehicle according to an embodiment of the present invention.

Referring to FIG. 2 and FIG. 4, an exemplary connection structure of a vehicle according to an embodiment of the present invention may comprise a fender apron upper 10, a front side member 20, and a front reinforcement 30.

In addition, in certain embodiments, the connection structure may further comprise a front sub-frame 70, a mounting bracket 80, and an extension gusset 90.

A front end portion of the fender apron upper 10 in a length direction thereof is connected to the front side member 20 and a rear end portion of the fender apron upper 10 in the length direction thereof is connected to at least one of a cowl 45 and a front pillar 40 (i.e. A-pillar) such that the fender apron upper 10 strengthens a front portion and a side portion of a vehicle body.

The fender apron upper 10 may comprise an inner portion 10a disposed at an inner side in a width direction of the vehicle and an outer portion 10b disposed at an outer side in the width direction of the vehicle.

A front end portion of the front side member 20 in a length direction thereof is connected to a back beam 50 and a rear end portion of the front side member 20 in the length direction thereof is connected to a lower portion of the vehicle body, such that the front side member 20 forms a frame of the front portion of the vehicle body in a length direction of the vehicle.

The back beam 50 is a member mounted in an inner side of a bumper (not shown) in order to absorb an external impact, and a member of the lower portion of the vehicle body, to which the rear end portion of the front side member 20 in the length direction thereof is connected, may be a dash cross member 60 forming a frame in the width direction of the vehicle in a lower portion of a dash panel.

Figure 5:
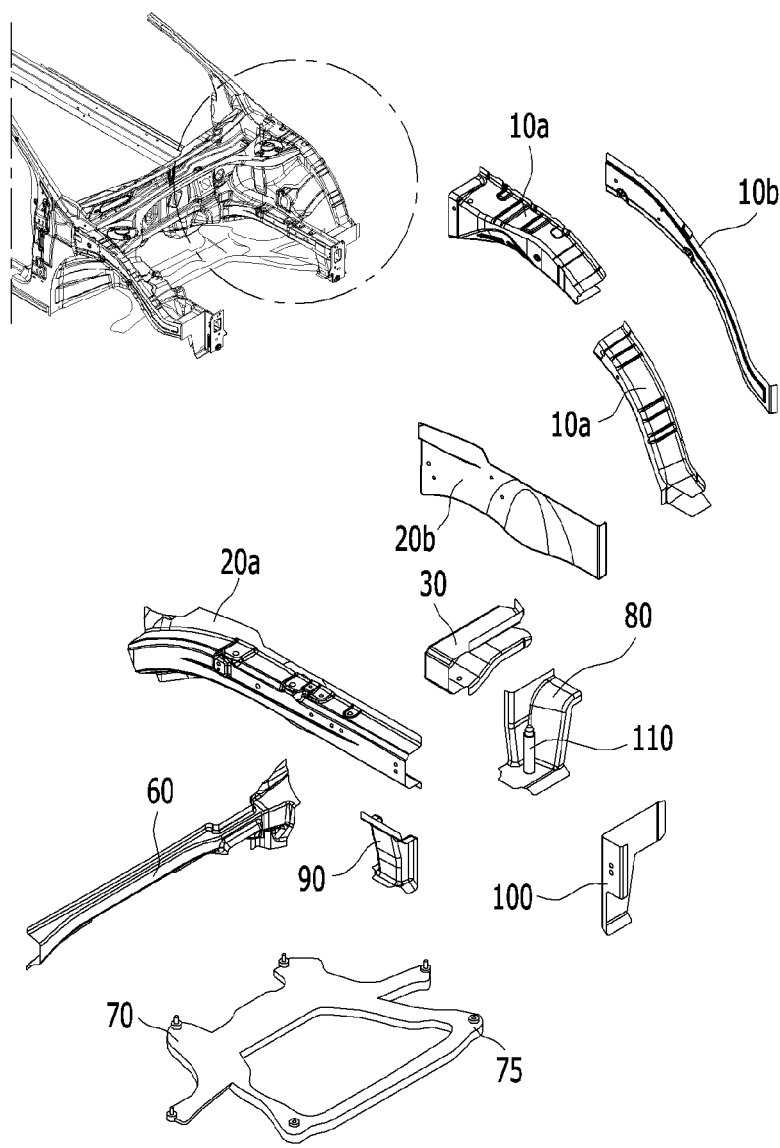
FIG. 5 is an exploded perspective view of an exemplary connection structure of a vehicle according to an embodiment of the present invention.

In addition, the front side member 20 may comprise an inner portion 20a disposed at an inner side in the width direction of the vehicle and an outer portion 20b disposed at an outer side in the width direction of the vehicle (see FIG. 5).

Both ends of the front reinforcement 30 may be coupled to the front end portion of the fender apron upper 10 in the length direction thereof and a front side portion of the front side member 20 in the length direction thereof, such that the front reinforcement 30 connects the fender apron upper 10 and the front side member 20 with a length direction of the front reinforcement 30. That is one end of the front reinforcement 30 is wider than the other end when viewed from the front direction.

An exemplary connection structure of a vehicle according to an embodiment of the present invention may be formed such that an exterior surface of an inner end portion of the front reinforcement 30 in the width direction of the vehicle makes contact with an interior surface of the front side member 20.

In this case, an exterior surface of an inner end portion of the front reinforcement 30 in the width direction of the vehicle makes contact with an interior surface of the inner portion 20a of the front side member 20.

The front reinforcement 30 may be mounted such that the length direction of the front reinforcement 30 is parallel or substantially parallel to the width direction of the vehicle, in a plurality of exemplary embodiments of the present invention. That is both ends of the front reinforcement 30 are the same width when viewed from the top direction.

FIG. 5 is an exploded perspective view of an exemplary connection structure of a vehicle according to an embodiment of the present invention.

Referring to FIG. 2, FIG. 4, and FIG. 5, the front reinforcement 30 may be mounted such that an interior surface or an exterior surface of a front end portion of the outer portion 20b of the front side member 20 in a length direction thereof makes contact with a rear surface of the front reinforcement 30 in the length direction of the vehicle.

In an exemplary embodiment of FIG. 5, an exterior surface (a kind of flange face) of a front end portion of the outer portion 20b of the front side member 20 in a length direction thereof makes contact with a rear surface of the front reinforcement 30 in the length direction of the vehicle.

Referring to FIG. 4 and FIG. 5, a portion of the exterior surface of the inner end portion of the front reinforcement 30 in the width direction of the vehicle may have a same or a substantially same shape as the interior surface of the inner portion 20a of the front side member 20.

In this case, at least two kinds of contacting surfaces are coupled, and thereby coupling strength is increased.

In addition, the front reinforcement 30 may have a shape such that a cross section of the front reinforcement 30, perpendicular to the length direction thereof, includes a straight line and at least two side lines, two one ends of the at least two side lines being connected respectively to both ends of the straight line and an opposite side of the straight line being open.

For example, the cross section may be a U letter shape.

Or, it may be a shape having more than three sides, a side of which is open.

In certain embodiments, when the fender apron upper 10 comprises the inner portion 10a and the outer portion 10b, the front reinforcement 30 may be mounted such that an exterior surface of an outer end portion of the front reinforcement 30 in the width direction of the vehicle makes contact with an interior surface or an exterior surface of a front end portion of the fender apron upper inner portion 10a in a length direction thereof.

In exemplary embodiments of FIG. 4 and FIG. 5, an exterior surface of an outer end portion of the front reinforcement 30 in the width direction of the vehicle makes contact with an interior surface of a front end portion of the inner portion 10a in a length direction thereof.

As explained so far, in an exemplary connection structure of a vehicle according to an embodiment of the present invention, two kinds of faces including faces almost perpendicular to the width direction of the vehicle and faces almost perpendicular to a height direction of the vehicle, are coupled by contacting respectively with each other, and thereby coupling strength becomes more increased than in the related art connection structure of a vehicle of FIG. 1 and FIG. 3, in which only one kind of faces are coupled.

However, exemplary embodiments are not limited to the above ones, and not only the above two kinds of faces but also faces almost perpendicular to a length direction of the vehicle may also be coupled by contacting respectively with each other.

In this case, three kinds of faces can be coupled respectively with each other.

For example, in case a front end of the inner portion 20a in the length direction of the vehicle has a closed structure, the three kinds of faces may be coupled respectively with each other.

In addition, an outer end portion of the front reinforcement 30 in the width direction of the vehicle may make contact with an interior surface of a front end portion of the fender apron upper outer portion 10b.

Through this, the outer end of the front reinforcement 30 in the width direction of the vehicle can be closed by the interior surface of the front end portion of the fender apron upper outer portion 10b.

An exemplary connection structure according to certain embodiments of the present invention may further comprise a front sub-frame 70 forming a ring-shaped or quadrangle frame of a front portion of a vehicle body and supporting an engine (not shown) or a suspension module (not shown), a mounting bracket 80 coupling the front reinforcement 30 and the front sub-frame 70, and an extension gusset 90 coupling the front side member 20 and the front sub-frame 70. In certain embodiments, the mounting bracket 80 may be mounted such that an interior surface of an upper end portion of the mounting bracket 80 in a height direction of the vehicle makes contact with an exterior surface of the front reinforcement 30, and the extension gusset 90 may be mounted such that an interior surface of an upper portion of the extension gusset 90 in the height direction of the vehicle makes contact with at least one of an exterior surface of the front side member 20.

In addition, in certain embodiments the connection structure may further comprise an outer front extension 100 making contact with at least one of a front end of the front side member 20 in a length direction thereof, a front end of the front reinforcement 30 in the length direction of the vehicle, a front end of the mounting bracket 80 in the length direction of the vehicle, and a front end of the extension gusset 90 in the length direction of the vehicle, in order to close a face including at least one of the front ends.

However, in certain embodiments, the mounting bracket 80 may be mounted such that an interior surface of an upper end portion of the mounting bracket 80 in the height direction of the vehicle makes contact with at least one of a lower surface of the front reinforcement 30 in the height direction of the vehicle and a rear surface of the front reinforcement 30 in the length direction of the vehicle, and the extension gusset 90 may be mounted such that an interior surface of an upper end portion of the extension gusset 90 in the height direction of the vehicle makes contact with at least one of an exterior surface of the inner portion 20a of the front side member 20, in case the front side member 20 comprises the inner portion 20a and the outer portion 20b, the fender apron upper 10 comprises the inner portion 10a and the outer portion 10b, and the cross section of the front reinforcement 30 has a U letter shape or a polygon a side of which is open.

In the above case, the outer front extension 100 makes contact with at least one of a front end of the inner portion 20a of the front side member 20 in a length direction thereof, a front end of the front reinforcement 30 in the length direction of the vehicle, a front end of the mounting bracket 80 in the length direction of the vehicle, and a front end of the extension gusset 90 in the length direction of the vehicle, and closes a face including at least one of the front ends.

In a connection structure explained above of the front reinforcement 30, the front side member 20 (or the inner portion 20a), and the front sub-frame 70, effective coupling structure can be realized because two kinds or three kinds of faces are coupled by respectively contacting with each other through the mounting bracket 80 and the extension gusset 90.

Referring to FIG. 4 and FIG. 5, a bolt 110 may be mounted on a lower portion of the mounting bracket 80, a lower portion of the bolt 110 in the height direction of the vehicle may be coupled to a bolt coupling portion 75 of the front sub-frame 70, and an upper portion of the bolt 110 in the height direction of the vehicle may be coupled to the front reinforcement 30, in an exemplary connection structure according to an embodiment of the present invention.

In this case, the upper portion of the bolt 110 in the height direction of the vehicle and the front reinforcement 30 may be coupled through $CO_2$ welding.

In certain embodiments, the extension gusset 90 and the outer front extension 100 may be coupled respectively to the front sub-frame 70 by welding.

Exemplary embodiments of the present invention are not limited to the above ones, and the mounting bracket 80 may be coupled to the front sub-frame 70 by spot welding or by both spot welding and a bolt coupling.

In certain embodiments, a surface portion of a lower end of the extension gusset 90 may be coupled to a lower surface of the mounting bracket 80 by contacting with each other, and, in this case, the contacting surfaces may be fixedly coupled to the front sub-frame 70 by spot welding.

Figure 6:
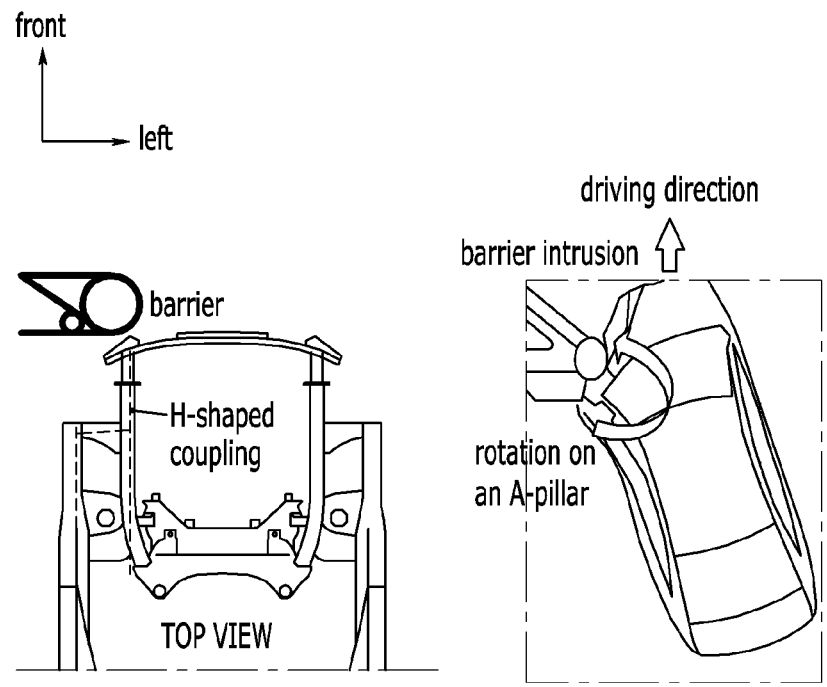
FIG. 6 is a top plan view for showing a result of a small overlap crash test of a connection structure of a vehicle in the related art.

FIG. 6 is a top plan view for showing a result of a small overlap crash test of a related art connection structure of a vehicle. The overlap crash test involves a front collision of the test vehicle with a barrier at a location offset from the centerline of the test vehicle.

Figure 7:
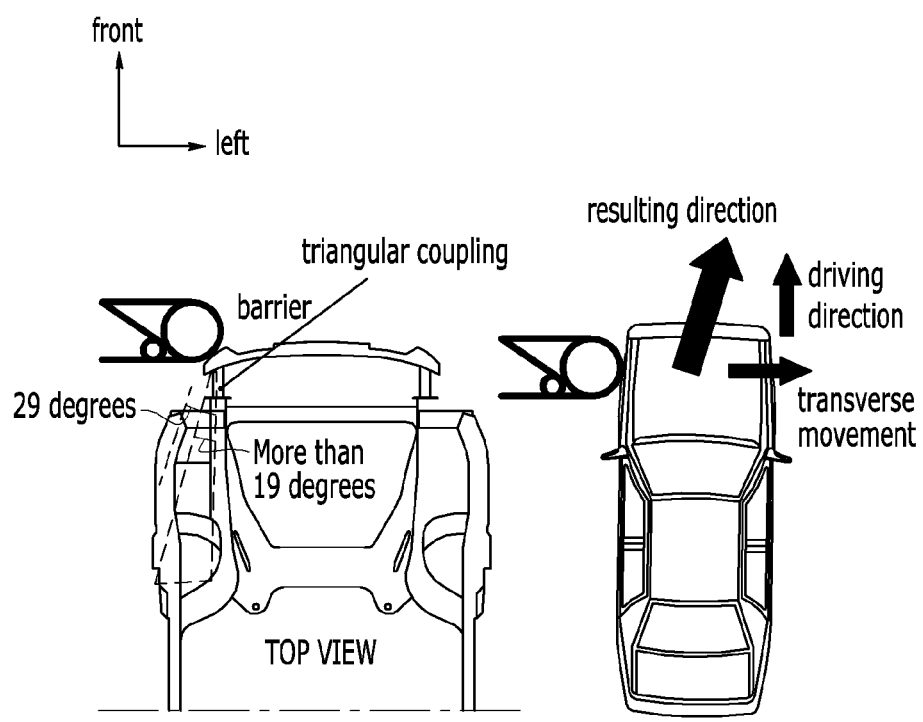
FIG. 7 is a top plan view for showing a result of a small overlap crash test of an exemplary connection structure of a vehicle according to an embodiment of the present invention.

FIG. 7 is a top plan view for showing a result of a small overlap crash test of an exemplary connection structure of a vehicle according to an embodiment of the present invention.

In case of a small overlap crash by a barrier with a related art connection structure of FIG. 6, coupling surfaces almost perpendicular to the width direction of the vehicle as illustrated in FIG. 3 are easily broken by action of shear load from an impact, and thereby the vehicle becomes to rotate on a front pillar. Therefore, an occupant's head move to a space other than a space in which an airbag deploys and an injury of the head can be severe.

Further, a transverse behavior of the vehicle is almost not generated when colliding.

Accordingly, almost all of crash energy is transmitted to the vehicle body, and damage to occupants becomes more increased.

To cope with this, it is general to add a reinforcement member or a plurality thereof to a transfer path of crash energy.

In case of a small overlap crash test, when a connecting line of coupling surfaces of a front pillar and a fender apron upper 10 to a front end of a crush box 55 forms an angle of more than 19 degrees with a length direction of the vehicle, a result of crash performance was satisfactory. The angle was 29 degrees and a favorable result was also acquired in an exemplary connection structure of FIG. 7 according to an embodiment of the present invention.

Referring to FIG. 7, in case of a small overlap crash, an exemplary connection structure according to an embodiment of the present invention induced a transverse behavior of a vehicle.

This is by an effective connection structure of a front side member, a fender apron upper, and a front sub-frame.

A front sub-frame is strongly coupled to an exemplary connection structure according to an embodiment of the present invention, and thereby a fender apron upper can play a role of guiding a transverse movement.

Quantity of crash energy transmitted to the vehicle body is reduced by the transverse movement.

Further, degree of vehicle damage and occupants' injury also decreases because transmitted crash energy is effectively dispersed through an exemplary connection structure according to an embodiment of the present invention.

Figure 8:
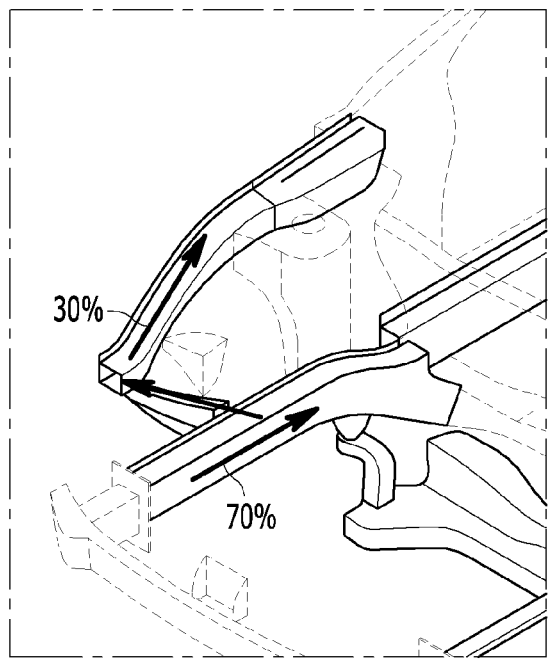
FIG. 8 is a figure showing a transfer path of crash energy in a related art connection structure of a vehicle in case of a small overlap crash.

FIG. 8 is a figure showing a transfer path of crash energy in a related art connection structure of a vehicle in case of a small overlap crash.

Figure 9:
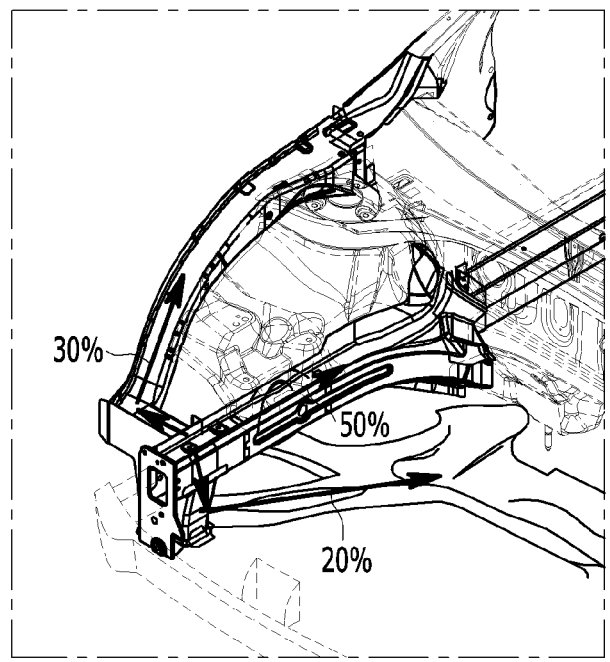
FIG. 9 is a figure showing a transfer path of crash energy in an exemplary connection structure of a vehicle according to an embodiment of the present invention in case of a small overlap crash.

FIG. 9 is a figure showing a transfer path of crash energy in an exemplary connection structure of a vehicle according to an embodiment of the present invention in case of a small overlap crash.

Comparing FIG. 8 and FIG. 9, because an exemplary connection structure of a vehicle according to an embodiment of the present invention is formed through effective coupling of two kinds or three kinds of faces by a front reinforcement, a mounting bracket, and an extension gusset, strength of the connection becomes large and transfer paths of crash energy are more effectively dispersed.

As explained in detail, effects below can be achieved, according to embodiments of the present invention.

First, lateral stiffness of an engine room increases through effective connection of a front side member, a fender apron upper, and a front sub-frame in a front side of a vehicle body.

Second, weight and cost decreases through deletion of reinforcement members for preparation of a crash.

Third, in case of a small overlap crash or an oblique test, crash energy having been concentrated to only a front side member before is well distributed to a fender apron upper and a front side member.

Fourth, in a connection structure of a fender apron upper and a front side member, two kinds of faces such as faces almost perpendicular to a width direction of a vehicle and faces almost perpendicular or perpendicular to a height direction of the vehicle, or three kinds of faces further including faces almost perpendicular to a length direction of the vehicle are coupled by contacting respectively with each other, and thereby the strength of the connection increases. Therefore, a fender apron upper and a front sub-frame also play a role of a reinforcement member, and deformation of an occupant room is minimized and a risk of occupants' injury also decreases.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A connection structure of a vehicle having a body, the connection structure comprising:
    a fender apron upper extending in a length direction of the vehicle, the fender apron upper having a front end portion and a rear end portion;
    a front side member extending in the length direction of the vehicle, the front side member having a front end portion and a rear end portion;
    a front reinforcement;
    a bumper; and
    a back beam mounted in an inner side of the bumper,
    wherein the front end portion of the fender apron upper is connected to the front reinforcement and the rear end portion of the fender apron upper is connected to at least one of a cowl and a front pillar such that the fender apron upper strengthens a front portion and a side portion of the body of the vehicle,
    wherein the front end portion of the front side member is connected to the back beam in order to absorb an external impact and the rear end portion of the front side member is connected to a lower portion of the body of the vehicle such that the front side member forms a part of a frame of the front portion of the body of the vehicle,
    wherein one end of the front reinforcement is coupled to the front end portion of the fender apron upper and the other end of the front reinforcement is coupled to a front side portion of the front side member,
    wherein an exterior surface of an inner end portion of the front reinforcement in a width direction of the vehicle makes contact with an interior surface of the front side member,
    wherein the front side member comprises: an inner portion disposed at an inner side in the width direction of the vehicle; and an outer portion disposed at an outer side in the width direction of the vehicle,
    wherein the front reinforcement is mounted such that the exterior surface of the inner end portion of the front reinforcement in the width direction of the vehicle makes contact with an interior surface of the inner portion of the front side member, and
    wherein a cross section of the front reinforcement, substantially perpendicular to the length direction thereof, is an open shape including a straight line and at least two side lines, each of two of the at least two side lines is connected to an end of the straight line, and an opening of the open shape is opposite the straight line.

2. The connection structure of claim 1,
    wherein the front reinforcement is mounted such that the length direction of the front reinforcement is parallel or substantially parallel to the width direction of the vehicle.

3. The connection structure of claim 1,
    wherein an interior surface or an exterior surface of a front end portion of the outer portion of the front side member in a length direction thereof makes contact with a rear surface of the front reinforcement in the length direction of the vehicle.

4. The connection structure of claim 1,
    wherein a portion of the exterior surface of the inner end portion of the front reinforcement in the width direction of the vehicle has a same or a substantially same shape as the interior surface of the inner portion of the front side member.

5. The connection structure of claim 1,
wherein the fender apron upper comprises:
an inner portion disposed at an inner side in the width direction of the vehicle; and
an outer portion disposed at an outer side in the width direction of the vehicle, and
wherein an exterior surface of an outer end portion of the front reinforcement in the width direction of the vehicle makes contact with an interior surface or an exterior surface of a front end portion of the inner portion of the fender apron upper in a length direction thereof.

6. The connection structure of claim 5,
wherein the outer end portion of the front reinforcement in the width direction of the vehicle makes contact with an interior surface of a front end portion of the outer portion of the fender apron upper.

7. The connection structure of claim 5, further comprising:
a front sub-frame forming a ring-shaped or quadrangle frame of the front portion of the vehicle body and supporting an engine and a suspension module;
a mounting bracket coupling the front reinforcement to the front sub-frame; and
an extension gusset coupling the front side member to the front sub-frame,
wherein the mounting bracket is mounted such that an interior surface of an upper end portion of the mounting bracket in a height direction of the vehicle makes contact with at least one of a lower surface of the front reinforcement in the height direction of the vehicle and a rear surface of the front reinforcement in the length direction of the vehicle, and
wherein the extension gusset is mounted such that an interior surface of an upper end portion of the extension gusset in the height direction of the vehicle makes contact with an exterior surface of the inner portion of the front side member.

8. The connection structure of claim 7, further comprising an outer front extension making contact with at least one of a front end of the inner portion of the front side member in a length direction thereof, a front end of the front reinforcement in the length direction of the vehicle, a front end of the mounting bracket in the length direction of the vehicle, and a front end of the extension gusset in the length direction of the vehicle, in order to close a face including at least one of the front ends.

9. The connection structure of claim 8,
wherein a bolt is mounted on a lower portion of the mounting bracket, and
wherein a lower portion of the bolt in the height direction of the vehicle is coupled to a bolt coupling portion of the front sub-frame and an upper portion of the bolt in the height direction of the vehicle is coupled to the front reinforcement.

10. The connection structure of claim 9,
wherein the upper portion of the bolt in the height direction of the vehicle and the front reinforcement are coupled through $CO_2$ welding.

11. A connection structure of a vehicle having a body, the connection structure comprising:
a fender apron upper extending in a length direction of the vehicle, the fender apron upper having a front end portion and a rear end portion;
a front side member extending in the length direction of the vehicle, the front side member having a front end portion and a rear end portion;
a front reinforcement;
a bumper;
a back beam mounted in an inner side of the bumper,
a front sub-frame forming a ring-shaped or quadrangle frame of the front portion of the vehicle body and supporting an engine and a suspension module,
a mounting bracket coupling the front reinforcement to the front sub-frame, and
an extension gusset coupling the front side member to the front sub-frame,
wherein the front end portion of the fender apron upper is connected to the front reinforcement and the rear end portion of the fender apron upper is connected to at least one of a cowl and a front pillar such that the fender apron upper strengthens a front portion and a side portion of the body of the vehicle,
wherein the front end portion of the front side member is connected to the back beam in order to absorb an external impact and the rear end portion of the front side member is connected to a lower portion of the body of the vehicle such that the front side member forms a part of a frame of the front portion of the body of the vehicle,
wherein one end of the front reinforcement is coupled to the front end portion of the fender apron upper and the other end of the front reinforcement is coupled to a front side portion of the front side member,
wherein an exterior surface of an inner end portion of the front reinforcement in a width direction of the vehicle makes contact with an interior surface of the front side member,
wherein the mounting bracket is mounted such that an interior surface of an upper end portion of the mounting bracket in a height direction of the vehicle makes contact with an exterior surface of the front reinforcement, and
wherein the extension gusset is mounted such that an interior surface of an upper end portion of the extension gusset in the height direction of the vehicle makes contact with an exterior surface of the front side member.

12. The connection structure of claim 11,
further comprising
an outer front extension making contact with at least one of a front end of the front side member in a length direction thereof, a front end of the front reinforcement in the length direction of the vehicle, a front end of the mounting bracket in the length direction of the vehicle, and a front end of the extension gusset in the length direction of the vehicle, in order to close a face including at least one of the front ends.

13. The connection structure of claim 12,
wherein a bolt is mounted on a lower portion of the mounting bracket, and
wherein a lower portion of the bolt in the height direction of the vehicle is coupled to a bolt coupling portion of the front sub-frame and an upper portion of the bolt in the height direction of the vehicle is coupled to the front reinforcement.

14. The connection structure of claim 12,
wherein the upper portion of the bolt in the height direction of the vehicle and the front reinforcement are coupled through $CO_2$ welding.

* * * * *